United States Patent
Cho et al.

(10) Patent No.: US 10,927,011 B2
(45) Date of Patent: Feb. 23, 2021

(54) METHOD FOR PRODUCING ZEOLITE HAVING CONTROLLED ALUMINUM CONTENT BY ADJUSTING COMPOSITION OF SYNTHESIS MIXTURE

(71) Applicants: INDUSTRY FOUNDATION OF CHONNAM NATIONAL UNIVERSITY, Gwangju (KR); KOREA UNIVERSITY RESEARCH AND BUSINESS FOUNDATION, Seoul (KR)

(72) Inventors: Sung June Cho, Gwangju (KR); Kwan Young Lee, Seoul (KR); Soon Hee Park, Gwangju (KR); Jin Hee Park, Gwangju (KR)

(73) Assignees: INDUSTRY FOUNDATION OF CHONNAM NATIONAL UNIVERSITY; KOREA UNIVERSITY RESEARCH AND BUSINESS FOUNDATION

( * ) Notice: Subject to any disclaimer, the term of this patent is extended or adjusted under 35 U.S.C. 154(b) by 0 days.

(21) Appl. No.: 16/639,553

(22) PCT Filed: Aug. 14, 2018

(86) PCT No.: PCT/KR2018/009315
§ 371 (c)(1),
(2) Date: Feb. 14, 2020

(87) PCT Pub. No.: WO2019/035628
PCT Pub. Date: Feb. 21, 2019

(65) Prior Publication Data
US 2020/0223707 A1 Jul. 16, 2020

(30) Foreign Application Priority Data
Aug. 14, 2017 (KR) .................. 10-2017-0102840

(51) Int. Cl.
*C01B 39/48* (2006.01)
*C01B 39/02* (2006.01)
*B01J 29/70* (2006.01)

(52) U.S. Cl.
CPC .......... *C01B 39/48* (2013.01); *B01J 29/7015* (2013.01); *C01B 39/026* (2013.01);
(Continued)

(58) Field of Classification Search
CPC .... C01B 39/026; C01B 39/48; B01J 29/7015; C01P 2002/85
See application file for complete search history.

(56) References Cited

U.S. PATENT DOCUMENTS 4,544,538 A * 10/1985 Zones ...................... B01J 29/70
423/706
5,225,179 A * 7/1993 Zones ...................... C01B 37/02
423/709
(Continued)

FOREIGN PATENT DOCUMENTS

JP 2016169118 A 9/2016
JP 2017124966 A 7/2017

OTHER PUBLICATIONS

Yamanaka et al, "Effect, of Structure-Directnig Agents on FAU-CHA Interzeolite Conversion and Preparation. of High Performanceti Performance CHA. Zeolite Membranes for the Dehydration of Acetic Add Solution", Bulletin of The Chemical Society of Japan, vol. 86, No. 11, 1333-1340 (2013) (Year: 2013).*
(Continued)

*Primary Examiner* — David M Brunsman
(74) *Attorney, Agent, or Firm* — Renaissance IP Law Group LLP

(57) ABSTRACT

Provided is a method for producing zeolite having a controlled aluminum content, wherein the sodium hydroxide
(Continued)

FIRST STEP OF PREPARING SYNTHESIS MIXTURE BY ADJUSTING THE COMPOSITION OF STRUCTURE DIRECTING AGENT AND SODIUM HYDROXIDE BASED ON ZEOLITE Y — S100

SECOND STEP OF PREPARING CHA BY SUBJETING SYNTHESIS MIXTURE TO HYDROTHERMAL REACTION AND CALCINATION — S200 molar concentration of a zeolite synthesis mixture can be adjusted to adjust the aluminum content in synthesized CHA. The structure of the low aluminum-content CHA produced by the provided method does not collapse even after high-temperature hydrothermal treatment, and thus the catalytic activity of the CHA can be maintained. Moreover, by adjusting the aluminum content in the framework, the properties of the produced CHA significantly change, and thus the CHA can be applied to various fields.

4 Claims, 8 Drawing Sheets

(52) U.S. Cl.
CPC ...... *C01P 2002/72* (2013.01); *C01P 2002/85* (2013.01); *C01P 2002/86* (2013.01); *C01P 2004/03* (2013.01)

(56) References Cited

U.S. PATENT DOCUMENTS

| | | | |
|---|---|---|---|
| 7,597,874 B1 * | 10/2009 | Miller | C01B 39/48 |
| | | | 423/700 |
| 9,296,620 B2 * | 3/2016 | Davis | C01B 39/48 |
| 2008/0159951 A1 * | 7/2008 | Miller | C01B 37/02 |
| | | | 423/704 |

OTHER PUBLICATIONS

Martin, Nuria et al., "High yield synthesis of high-silica chabazite by combining the role of zeolite precursors and tetraethylammonium: SCR of NOx", Chem. Commun., 2015, 51, 9965-9968.
Xiong, Xin et al., "Efficient and rapid transformation of high silica CHA zeolite from FAU zeolite in the absence of water", Journal of Materials Chemistry A, 2017, 5, 9076-9080.

* cited by examiner $N_2$ adsorption-desorption isotherm

US 10,927,011 B2

METHOD FOR PRODUCING ZEOLITE HAVING CONTROLLED ALUMINUM CONTENT BY ADJUSTING COMPOSITION OF SYNTHESIS MIXTURE

This application is a 371 filing of PCT/KR2018/009315, filed Aug. 14, 2018.

TECHNICAL FIELD

The present disclosure relates to zeolite, and more particularly, to a method of producing a zeolite having a controlled aluminum content by adjusting the composition of synthesis mixture.

BACKGROUND ART

Zeolites have a unique three-dimensional crystal structure of aluminosilicate, and due to having a large surface area and a wide control of acidity, they have been widely used as a catalyst, an adsorbent, a molecular sieve, an ion exchanger, and the like.

Since acid sites with low electron density are generated therein due to the aluminum atoms present in the zeolite framework, zeolites have a wide range of acidity depending on the aluminum content, and thus are widely applied to various acid catalysis. Zeolites with a high aluminum content have the disadvantage of low hydrothermal stability because, when exposed to high temperature in the presence of water, the aluminum atoms in the tetrahedral coordination in the zeolite framework escape from the framework, causing the zeolite structure to collapse. On the other hand, zeolites with an excessively low aluminum content have low catalytic performance as acid catalysts, and therefore, zeolites with an appropriate aluminum content are required depending on the reaction. Since a Si/Al molar ratio indicating such aluminum content is an important factor in determining catalyst properties, many studies have been conducted to control the Si/Al molar ratio by appropriately adjusting the synthesis conditions. In particular, copper ion-exchanged Cu/SSZ-13 (CHA), which is used in a selective catalytic reduction (SCR) catalyst for removing nitrogen oxides from automobile exhaust, exhibits high activity over a wide temperature range and has excellent hydrothermal stability compared to other zeolites, and thus is in the spotlight as an automotive post-treatment catalyst. However, since high hydrothermal stability is indispensable for a SCR catalyst of automotive post-treatment system, the zeolite catalysts which are currently commercialized have limitations in use.

DISCLOSURE

Technical Problem

The present inventive concept is directed to providing a method of producing a zeolite which has a controlled aluminum content so as to have improved activity and improved hydrothermal stability when used as a catalyst.

However, the technical objectives of the present inventive concept are not limited to those described above, and other unmentioned technical objectives will be clearly understood by those skilled in the art from the following description.

Technical Solution

One aspect of the present inventive concept provides a method of producing a zeolite having a controlled aluminum content, the method including: a first step of preparing a synthesis mixture by adjusting the compositions of a structure directing agent and sodium hydroxide based on zeolite Y; and a second step of preparing CHA by subjecting the synthesis mixture to a hydrothermal reaction and calcination.

In the method of producing a zeolite having a controlled aluminum content of the present inventive concept, zeolite Y may be a raw material as silica and alumina.

In the method of producing a zeolite having a controlled aluminum content of the present inventive concept, the structure directing agent may be trimethyladamantylammonium hydroxide (AdaOH), benzyl ammonium hydroxide, benzyl ammonium chloride, or choline chloride.

In the method of producing a zeolite having a controlled aluminum content of the present inventive concept, in the synthesis mixture, the synthesis mixture does not contain CHA seed crystal.

In the method of producing a zeolite having a controlled aluminum content of the present inventive concept, in the synthesis mixture, the structure directing agent may be included at a concentration of 0.1 to 0.4 mole based on 1 mole of silica ($SiO_2$).

In the method of producing a zeolite having a controlled aluminum content of the present inventive concept, in the synthesis mixture, the sodium hydroxide may be included at a concentration of 0.1 to 0.7 mole based on 1 mole of silica ($SiO_2$).

In the method of producing a zeolite having a controlled aluminum content of the present inventive concept, the hydrothermal reaction may be carried out at 120 to 140° C. for 2 to 6 days under rotation of 0 to 60 rpm, resulting in CHA production.

Advantageous Effects

When the zeolite produced by controlling the aluminum content in a CHA structure according to the present inventive concept as described above is used as a catalyst, an effect of improving the catalytic activity and hydrothermal stability of zeolite can be produced.

In addition, the prepared CHA zeolite can be applied to various fields because the characteristic properties are different by controlling the aluminum content in the CHA framework.

However, the effects of the present inventive concept are not limited to the effects described above, and other unmentioned effects will be clearly understood by those skilled in the art from the following description.

DETAILED DESCRIPTION

Figure 1:
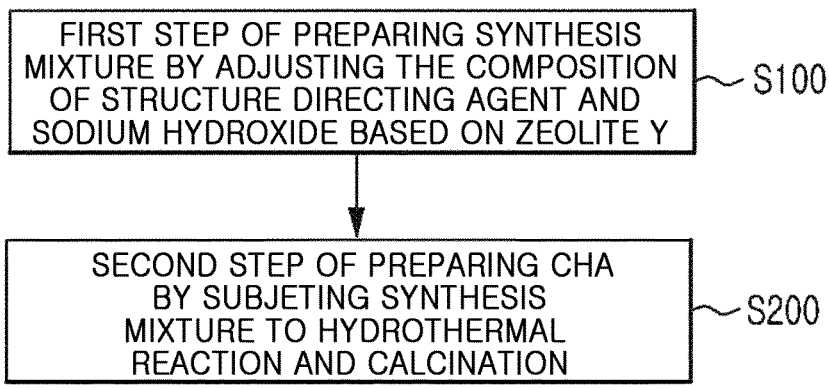
FIG. 1 is a flowchart illustrating a method of producing a zeolite having a controlled aluminum content according to one embodiment of the present inventive concept.

Hereinafter, exemplary embodiments of the present inventive concept will be described in detail with reference to the accompanying drawings.

However, the embodiments of the present inventive concept may be modified into various other forms, and the scope of the present inventive concept is not limited to the embodiments described below. In addition, the embodiments of the present inventive concept are provided to more completely explain the present inventive concept to those of ordinary skill in the art. Therefore, the shape, size, and the like of elements may be exaggerated in the drawings for clarity, and the elements denoted by the same reference numerals in the drawings are the same elements.

FIG. 1 is a flowchart illustrating a method of producing a zeolite having a controlled aluminum content according to one embodiment of the present inventive concept.

FIG. 1 discloses a method of producing a zeolite having a controlled aluminum content.

S100 is a first step in which a synthesis mixture is prepared by adjusting the composition of a structure directing agent and sodium hydroxide based on zeolite Y. Here, zeolite Y may be a raw material as silica and alumina source. Examples of silica sources may include zeolites, silicates, silica hydrogels, silicic acid, colloidal silica, fumed silica, tetraalkyl orthosilicates, silica hydroxides, and precipitated silica. In addition, examples of alumina sources may include sodium aluminate ($NaAlO_2$), $AlCl_3$, $Al_2(SO_4)_3$, aluminum hydroxide ($Al(OH)_3$), kaolin, clay, and zeolites.

The structure directing agent may be trimethyladamantylammonium hydroxide (AdaOH), benzyl ammonium hydroxide, benzyl ammonium chloride, or choline chloride, and in addition, other materials commonly used in the preparation of CHA may be included.

The synthesis mixture may be a hydrogel in which the molar concentrations of the sodium hydroxide and the structure directing agent have been adjusted. In the synthesis mixture, the sodium hydroxide may be included at a concentration of, for example, 0.1 to 0.7 mole based on 1 mole of silica ($SiO_2$), in which case the structure directing agent may be included at a concentration of 0.1 to 0.4 mole. Therefore, the aluminum content in the structure of the prepared CHA may vary depending on the usage amount of the sodium hydroxide.

S200 is a second step in which the above-described synthesis mixture is subjected to a hydrothermal reaction and calcination to prepare CHA zeolite. After adding the synthesis mixture to an autoclave, a hydrothermal reaction is carried out at 120 to 140° C. for 2 to 6 days under rotation of 0 to 60 rpm. The product is recovered by centrifugation, washed, and then calcined at 550° C. for 12 h, CHA may be obtained.

MODES OF THE INVENTION

Hereinafter, experimental examples will be provided to facilitate understanding of the present inventive concept. However, the following experimental examples are provided only to facilitate understanding of the present inventive concept and are not intended to limit the present inventive concept.

The following Table 1 summarizes synthesis conditions of the experimental examples for preparing a CHA synthesis mixture.

TABLE 1

| | | Synthesis conditions | | |
|---|---|---|---|---|
| | Molar composition of synthesis mixture ($SiO_2$:NaOH:AdaOH:$H_2O$) | Temperature (° C.) | Time (d) | Rotation speed (rpm) |
| Preparation Example 1 | 1.0:0.2:0.15:22 | 140 | 4 | 40 |
| Preparation Example 2 | 1.0:0.3:0.15:22 | | | |
| Preparation Example 3 | 1.0:0.4:0.15:22 | | | |
| Preparation Example 4 | 1.0:0.45:0.15:22 | | | |
| Preparation Example 5 | 1.0:0.5:0.15:22 | | | |
| Preparation Example 6 | 1.0:0.6:0.15:22 | | | |
| Preparation Example 7 | 1.0:0.2:0.14:22 | | | 0 |
| Preparation Example 8 | 1.0:0.3:0.14:22 | | | |
| Preparation Example 9 | 1.0:0.4:0.14:22 | | | |
| Preparation Example 10 | 1.0:0.45:0.14:22 | | | |
| Preparation Example 11 | 1.0:0.5:0.14:22 | | | |

Preparation Example 1

A synthesis mixture having a molar composition of 1.0 $SiO_2$:0.2 NaOH:0.15 AdaOH:22 $H_2O$ was subjected to a hydrothermal reaction for 4 days at 140° C. under rotation of 40 rpm. The product was recovered by centrifugation, washed, and calcined at 550° C. for 12 h, and thereby CHA was obtained.

Preparation Example 2

CHA was synthesized in the same manner as in Preparation Example 1 except that a NaOH molar concentration of 0.3 was used for the preparation of a synthesis mixture.

Preparation Example 3

CHA was synthesized in the same manner as in Preparation Example 1 except that a NaOH molar concentration of 0.4 was used for the preparation of a synthesis mixture.

Preparation Example 4

CHA was synthesized in the same manner as in Preparation Example 1 except that a NaOH molar concentration of 0.45 was used for the preparation of a synthesis mixture.

Preparation Example 5

CHA was synthesized in the same manner as in Preparation Example 1 except that a NaOH molar concentration of 0.5 was used for the preparation of a synthesis mixture.

Preparation Example 6

CHA was synthesized in the same manner as in Preparation Example 1 except that a NaOH molar concentration of 0.6 was used for the preparation of a synthesis mixture.

Preparation Example 7

A synthesis mixture having a molar composition of 1.0 $SiO_2$:0.2 NaOH:0.14 AdaOH:22 $H_2O$ was subjected to a hydrothermal reaction for 4 days at 140° C. in a stationary state without rotation. The product was recovered by centrifugation, washed and then calcined at 550° C. for 12 h, and thereby CHA was obtained.

Preparation Example 8

CHA was synthesized in the same manner as in Preparation Example 7 except that a NaOH molar concentration of 0.3 was used for the preparation of a synthesis mixture.

Preparation Example 9

CHA was synthesized in the same manner as in Preparation Example 7 except that a NaOH molar concentration of 0.4 was used for the preparation of a synthesis mixture.

Preparation Example 10

CHA was synthesized in the same manner as in Preparation Example 7 except that a NaOH molar concentration of 0.45 was used for the preparation of a synthesis mixture.

Preparation Example 11

CHA was synthesized in the same manner as in Preparation Example 7 except that a NaOH molar concentration of 0.5 was used for the preparation of a synthesis mixture.

Figure 2:
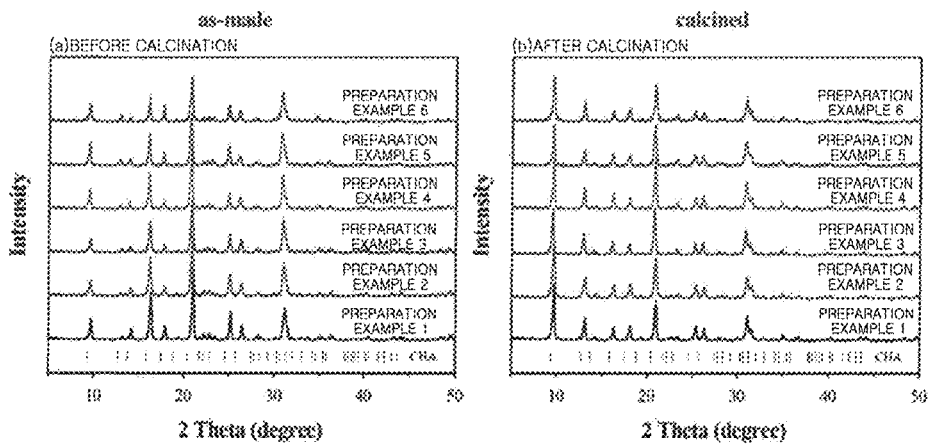
FIG. 2 shows X-ray diffraction (XRD) patterns of Preparation Examples 1 to 6 of the present inventive concept before and after calcination.

FIG. 2 shows XRD patterns of Preparation Examples 1 to 6 of the present inventive concept before and after calcination.

Referring to FIG. 2, it can be seen that CHA with excellent crystallinity was produced in all of Preparation Examples 1 to 6 regardless of the molar concentration of sodium hydroxide in the synthesis mixture. In addition, it can be seen that the crystallinity of CHA was well maintained even after calcination.

Figure 3:
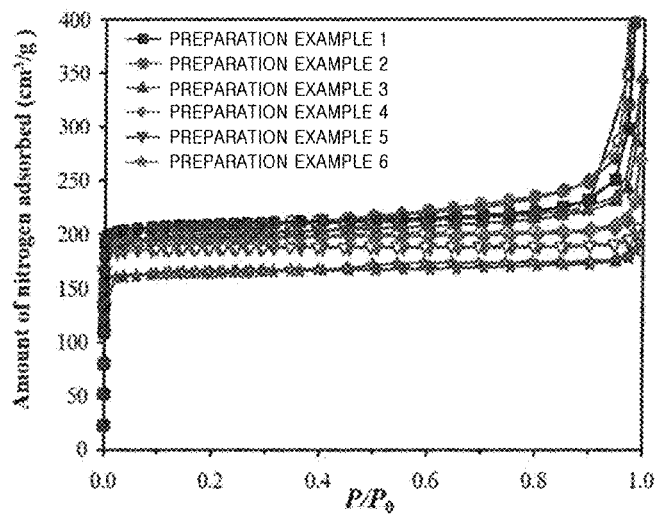
FIG. 3 is nitrogen adsorption isotherms of Preparation Examples 1 to 6 of the present inventive concept.

FIG. 3 is nitrogen adsorption-desorption isotherms of Preparation Examples 1 to 6 of the present inventive concept.

Referring to FIG. 3, it can be seen that CHA having a large surface area and a large pore volume as shown in Table 2 was obtained due to the development of micropores.

TABLE 2

|  | BET surface area ($m^2g^{-1}$) | Pore volume[a] ($cm^3g^{-1}$) |
|---|---|---|
| Preparation Example 1 | 857 | 0.33 |
| Preparation Example 2 | 834 | 0.31 |
| Preparation Example 3 | 813 | 0.32 |
| Preparation Example 4 | 793 | 0.32 |
| Preparation Example 5 | 781 | 0.31 |
| Preparation Example 6 | 682 | 0.27 |

[a]Total pore volume calculated when $P/P_0$ is 0.99

Referring to Table 2, it can be seen that as the molar concentration (i.e., addition amount) of the sodium hydroxide increased, the surface area decreased but the pore volume did not significantly change, except for the case where CHA was prepared from a synthesis mixture having a high sodium hydroxide molar concentration of 0.6, whose surface area and pore volume were significantly small compared to other Preparation Examples.

Figure 4:
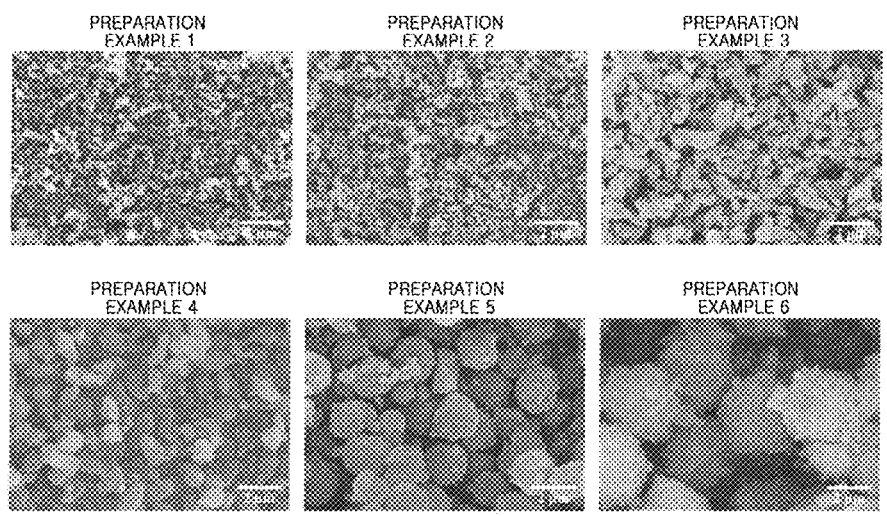
FIG. 4 shows SEM images of Preparation Examples 1 to 6 of the present inventive concept.

FIG. 4 shows SEM images of Preparation Examples 1 to 6 of the present inventive concept.

Referring to FIG. 4, it can be seen that particles of a uniform size were produced in all of Preparation Examples 1 to 6 and that the particle size varied according to the sodium hydroxide concentration of the synthesis mixture. Therefore, by adjusting the sodium hydroxide concentration of the synthesis mixture, it is possible to adjust the particle size over a wide range of 0.1 to 5.0 µm.

Figure 5:
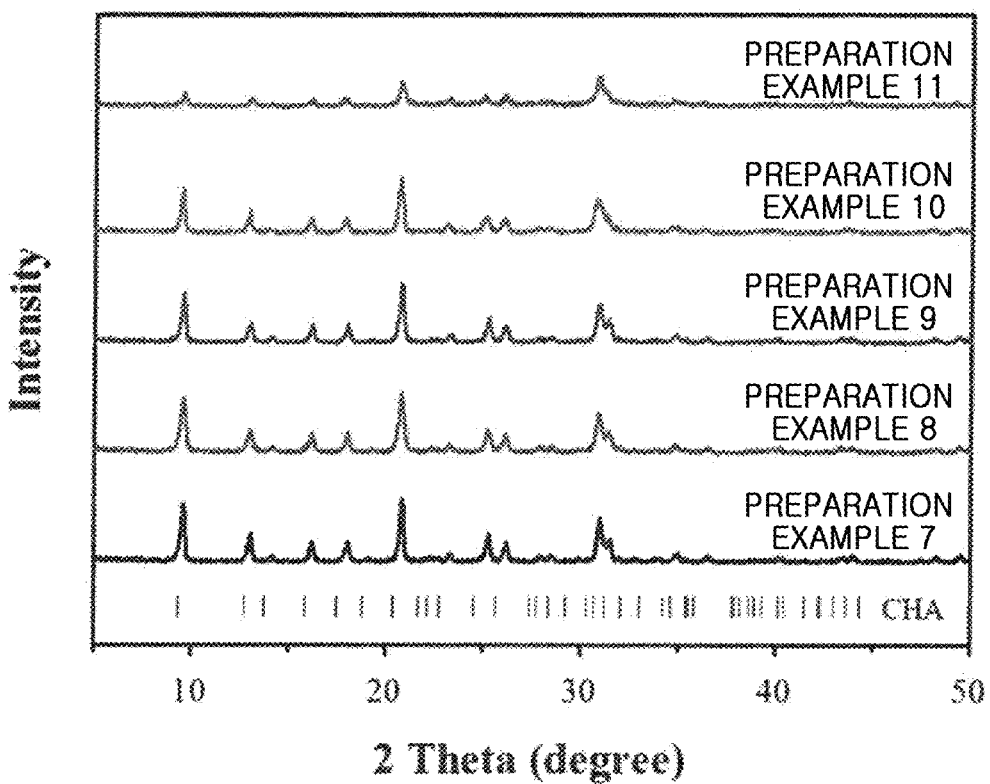
FIG. 5 is XRD patterns of Preparation Examples 7 to 11 of the present inventive concept after a hydrothermal reaction was carried out under the stationary state.

FIG. 5 is XRD patterns of Preparation Examples 7 to 11 of the present inventive concept after a hydrothermal reaction was carried out in a stationary state.

Referring to FIG. 5, it can be seen that CHA was successfully synthesized even in Preparation Examples 7 to 11, where the hydrothermal reaction was carried out under the stationary state.

Figure 6:
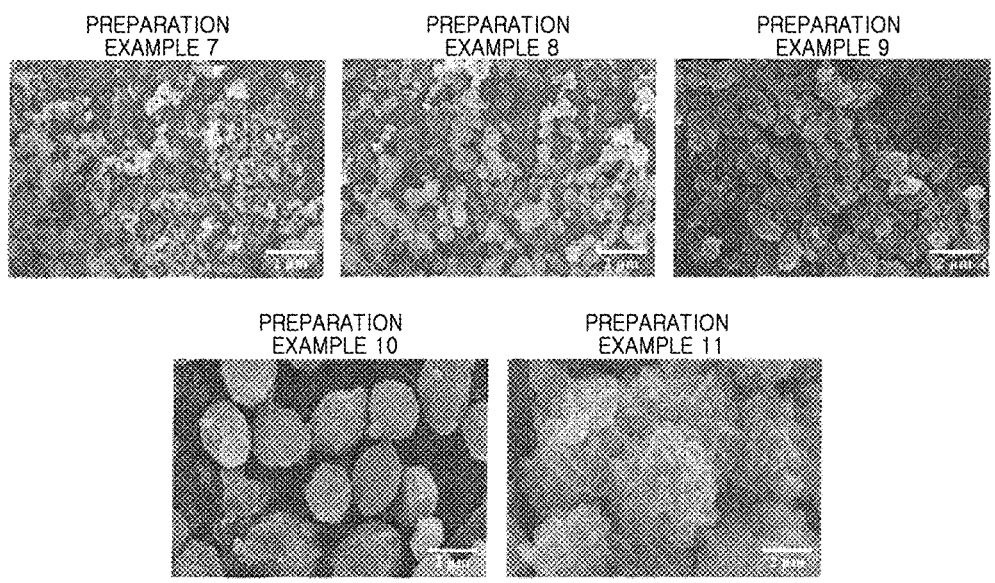
FIG. 6 shows SEM images of Preparation Examples 7 to 11 of the present inventive concept.

FIG. 6 shows SEM images of Preparation Examples 7 to 11 of the present inventive concept.

Referring to FIG. 6, it can be seen that particles of a uniform size were produced even in Preparation Examples 7 to 11, where the hydrothermal reaction was carried out under the stationary state. In addition, it can be seen that even when the hydrothermal reaction was carried out under the stationary state, it is possible to adjust the particle size to a range of 0.1 to 5.0 µm similarly to the case where the synthesis was carried out under rotation.

Figure 7:
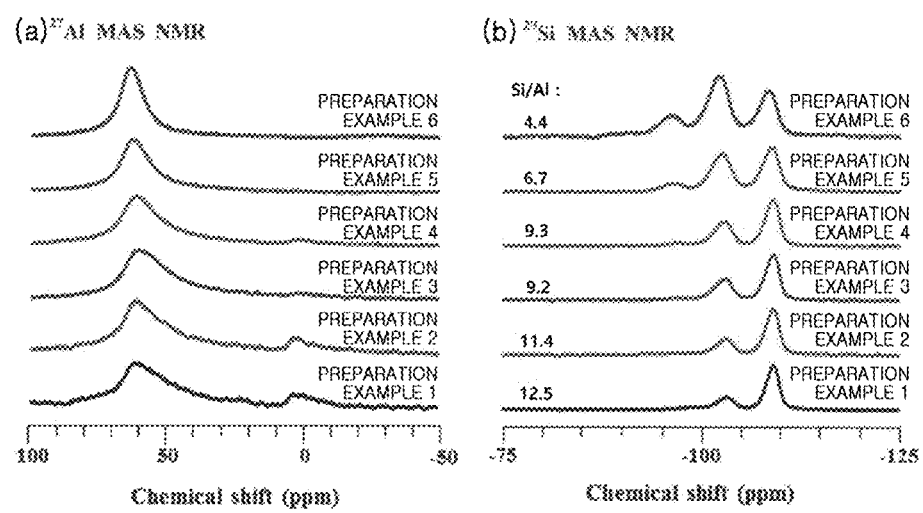
FIG. 7 is NMR spectra for determining the chemical state of the aluminum and silicon of Preparation Examples 1 to 6 of the present inventive concept.

FIG. 7 is NMR spectra for determining the chemical state of the aluminum and silicon of Preparation Examples 1 to 6 of the present inventive concept.

Referring to FIG. 7, it can be seen that all the aluminum and silicon atoms of the CHA prepared in Preparation Examples 1 to 6 were in tetrahedral coordination in the zeolite framework.

The following Table 3 summarizes the values calculated from FIG. 7.

TABLE 3

|  | Na/Si molar ratio of synthesis mixture | Na/Al molar ratio of product[a] | Si/Al molar ratio of product | |
|---|---|---|---|---|
|  |  |  | EDX[a] | NMR[b] |
| Preparation Example 1 | 0.20 | 0.40 | 14.2 | 12.5 |
| Preparation Example 2 | 0.30 | 0.33 | 12.8 | 11.4 |
| Preparation Example 3 | 0.40 | 0.48 | 9.9 | 9.2 |
| Preparation Example 4 | 0.45 | 0.53 | 8.9 | 9.3 |
| Preparation Example 5 | 0.50 | 0.68 | 5.9 | 6.7 |

TABLE 3-continued

|  | Na/Si molar ratio of synthesis mixture | Na/Al molar ratio of product[a] | Si/Al molar ratio of product | |
| --- | --- | --- | --- | --- |
|  |  |  | EDX[a] | NMR[b] |
| Preparation Example 6 | 0.60 | 0.67 | 4.5 | 4.4 |
| Preparation Example 7 | 0.20 | 0.36 | 11.7 | — |
| Preparation Example 8 | 0.30 | 0.45 | 11.0 | — |
| Preparation Example 9 | 0.40 | 0.48 | 10.1 | — |
| Preparation Example 10 | 0.50 | 0.74 | 5.6 | — |
| Preparation Example 11 | 0.60 | 0.86 | 3.7 | — |

[a]Values calculated from the EDX result;
[b]Values calculated from the $^{29}$Si MAS NMR spectrum Referring to Table 3, the Si/Al molar ratios obtained from the EDX result and the $^{29}$Si MAS NMR spectrum decreased as the sodium hydroxide concentration of the synthesis mixture increased. This result indicates that the aluminum content in the zeolite framework increased, and shows that by varying the sodium hydroxide concentration of the synthesis mixture, it is possible to adjust the Si/Al molar ratio over a wide range of 4 to 14.

Figure 8:
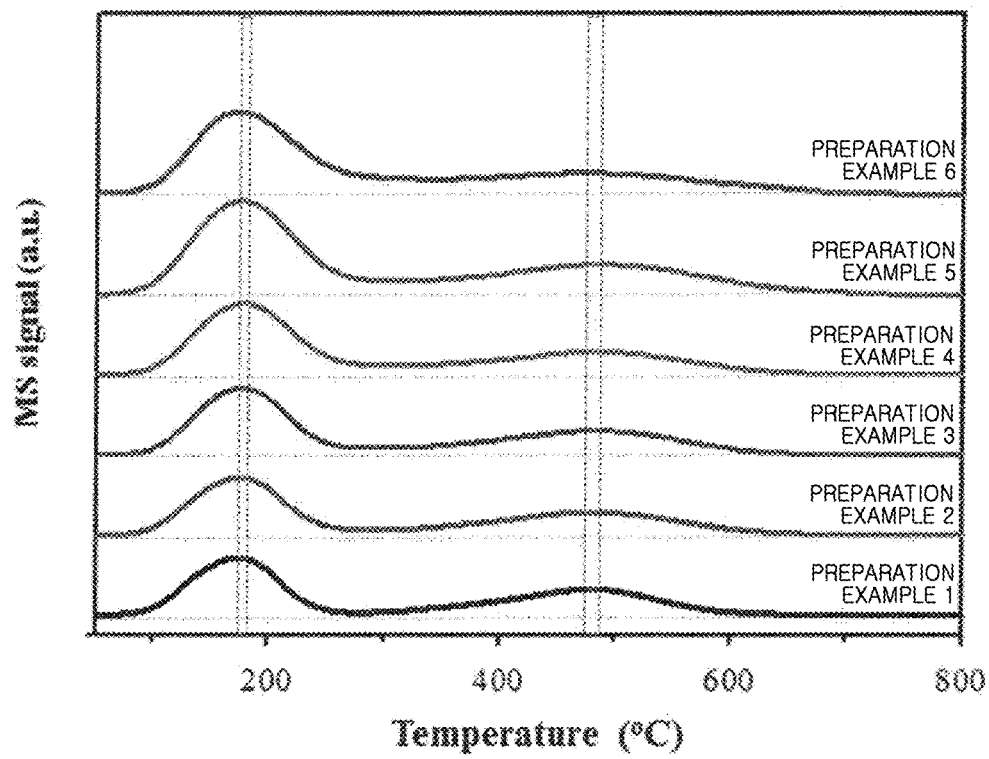
FIG. 8 is ammonia temperature-programmed desorption (TPD) curves of Preparation Examples 1 to 6 of the present inventive concept.

FIG. 8 is ammonia temperature-programmed desorption (TPD) curves of Preparation Examples 1 to 6 of the present inventive concept.

Referring to FIG. 8, it can be seen that as the sodium hydroxide content of the synthesis mixture varies, the aluminum content of the CHA prepared in Preparation Examples 1 to 6 changes and, accordingly, the strength and amount of strong acid sites and weak acid sites are different.

The following Table 4 summarizes the values calculated from FIG. 8.

TABLE 4

|  | Amount of weak acid sites (mmol/g) | Amount of strong acid sites (mmol/g) | Total amount of acid sites (mmol/g) |
| --- | --- | --- | --- |
| Preparation Example 1 | 0.521 | 0.443 | 0.964 |
| Preparation Example 2 | 0.585 | 0.441 | 1.026 |
| Preparation Example 3 | 0.698 | 0.440 | 1.138 |
| Preparation Example 4 | 0.776 | 0.463 | 1.239 |
| Preparation Example 5 | 1.050 | 0.678 | 1.728 |
| Preparation Example 6 | 0.982 | 0.513 | 1.495 |

In Table 4, the amount of weak acid sites is calculated from the peak area corresponding to a temperature below 300° C. in the TPD curves of FIG. 8, the amount of strong acid sites is calculated from the peak area corresponding to a temperature above 300° C. in the TPD curves of FIG. 8, and the total amount of acid sites is the sum of the amount of weak and strong acid sites, respectively. Here, it can be seen that the higher the sodium hydroxide concentration of the synthesis mixture, the higher the aluminum content of the synthesized CHA, resulting in an increase in the total amount of acid sites.

Figure 9:
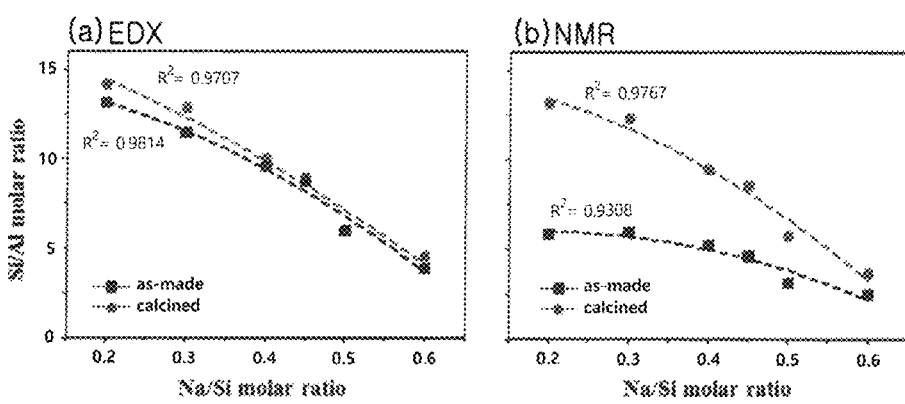
FIG. 9 shows correlation curves between the Si/Al molar ratio of the product changes with respect to the Na/Si molar ratio of a synthesis mixture according to one embodiment of the present inventive concept.

FIG. 9 shows correlation curves between the Si/Al molar ratio of the product changes with respect to the Na/Si molar ratio of a synthesis mixture according to one embodiment of the present inventive concept.

In FIG. 9, (a) simulates the correlation between the Na/Si molar ratio of the synthesis mixture and the Si/Al molar ratio of the product from the EDX result, and (b) is the correlation curves between the Na/Si molar ratio of the synthesis mixture and the Si/Al molar ratio of the product from the NMR spectra. The correlation between the Na/Si molar ratio of the synthesis mixture and the Si/Al molar ratio of the CHA synthesized can be well simulated as a quadratic function. Therefore, by adjusting the sodium hydroxide concentration of the synthesis mixture, it is possible to easily and reproducibly adjust the aluminum content of CHA to a target value.

Figure 10:
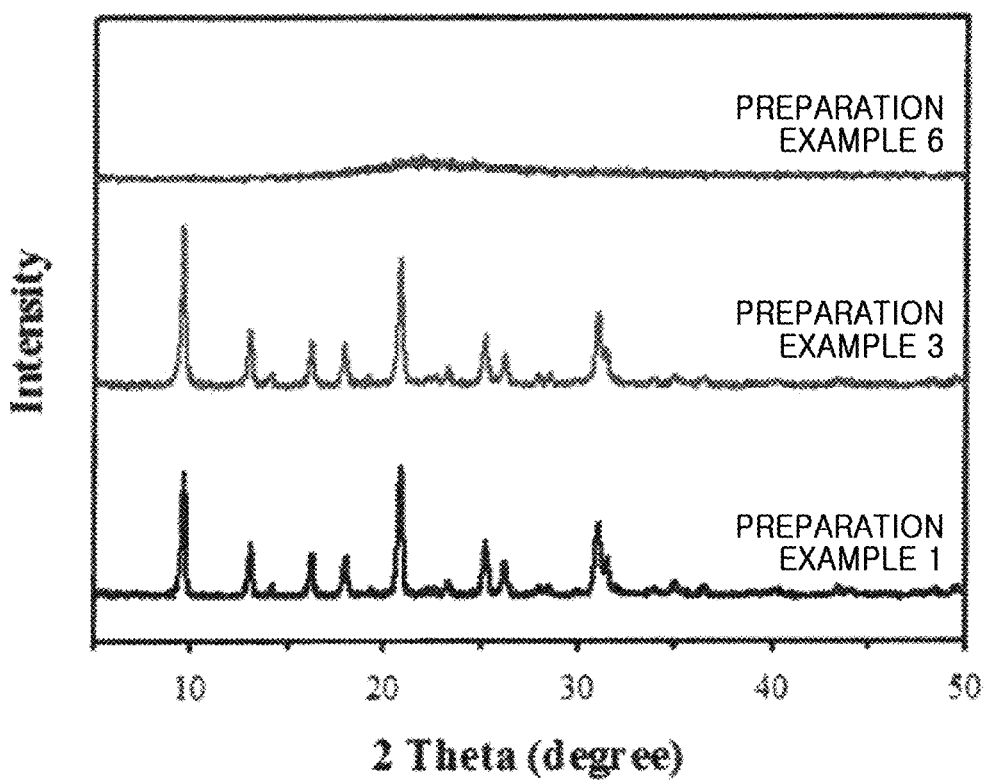
FIGS. 10 and 11 shows the hydrothermal stability of Preparation Examples 1, 3, and 6 of the present inventive concept.
Figure 11:
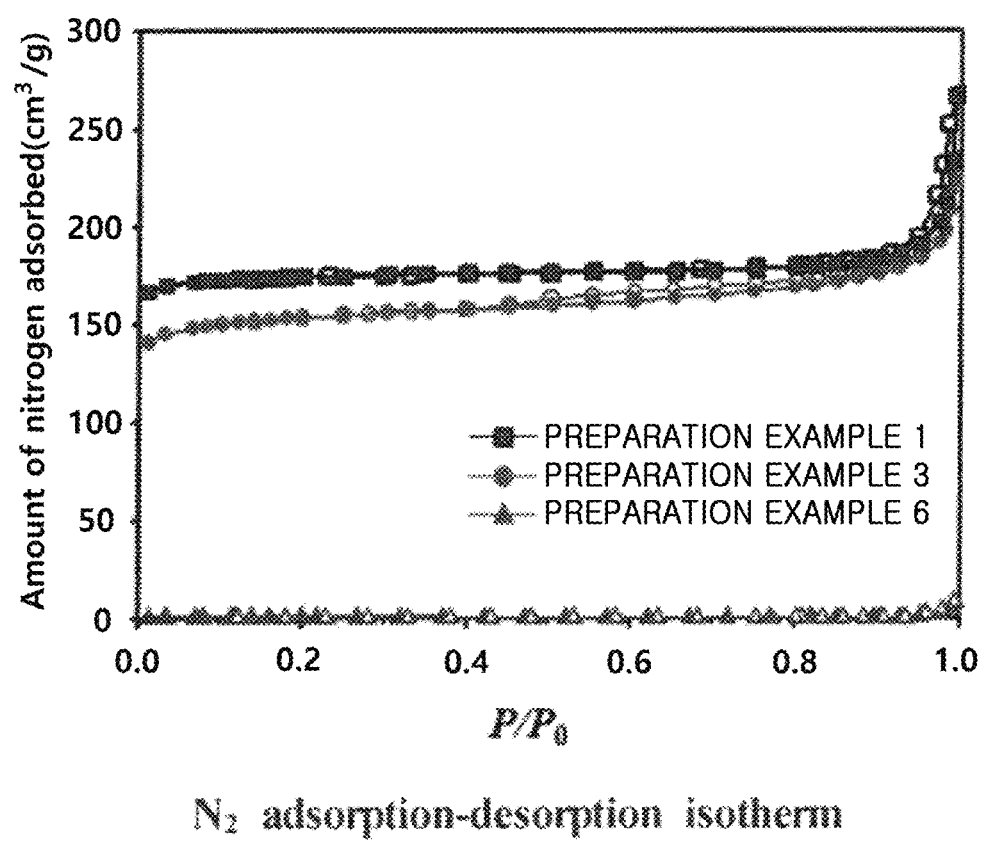

FIGS. 10 and 11 shows the hydrothermal stability of Preparation Examples 1, 3, and 6 of the present inventive concept.

Referring to FIGS. 10 and 11, it can be seen that when the addition amount of sodium hydroxide was large (Preparation Example 6), CHA having a high aluminum content was synthesized, in which case, the crystal structure collapsed and the surface area drastically decreased even after 800° C. hydrothermal treatment. On the other hand, it can be seen that in the case of Preparation Example 1 where the aluminum content was relatively low, the amount of nitrogen adsorption hardly decreased even after 800° C. hydrothermal treatment, which indicates that the hydrothermal stability was quite excellent.

Figure 12:
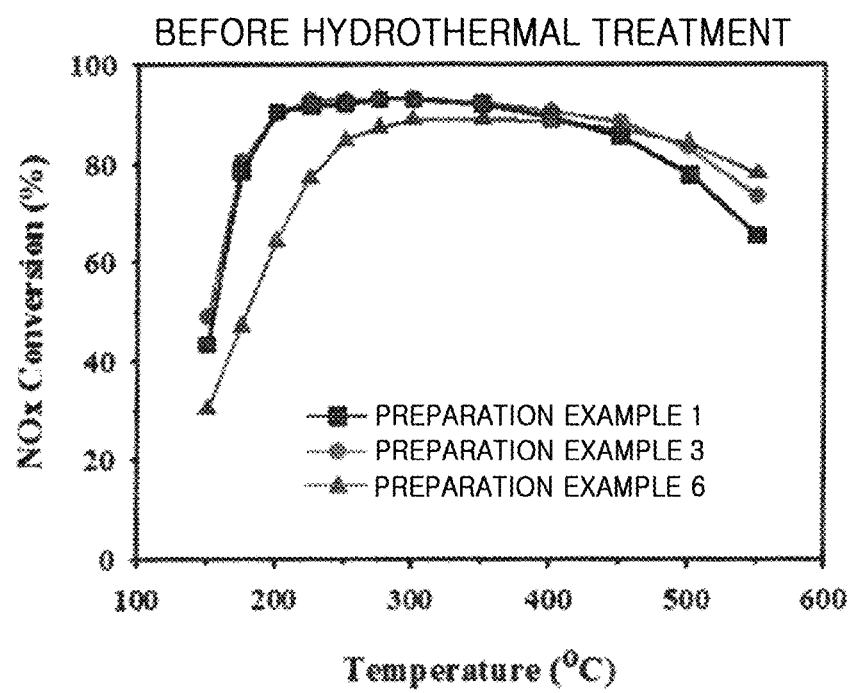
FIGS. 12 and 13 are graphs showing the catalytic performance ($NH_3$-SCR) of Preparation Examples 1, 3, and 6 of the present inventive concept.
Figure 13:
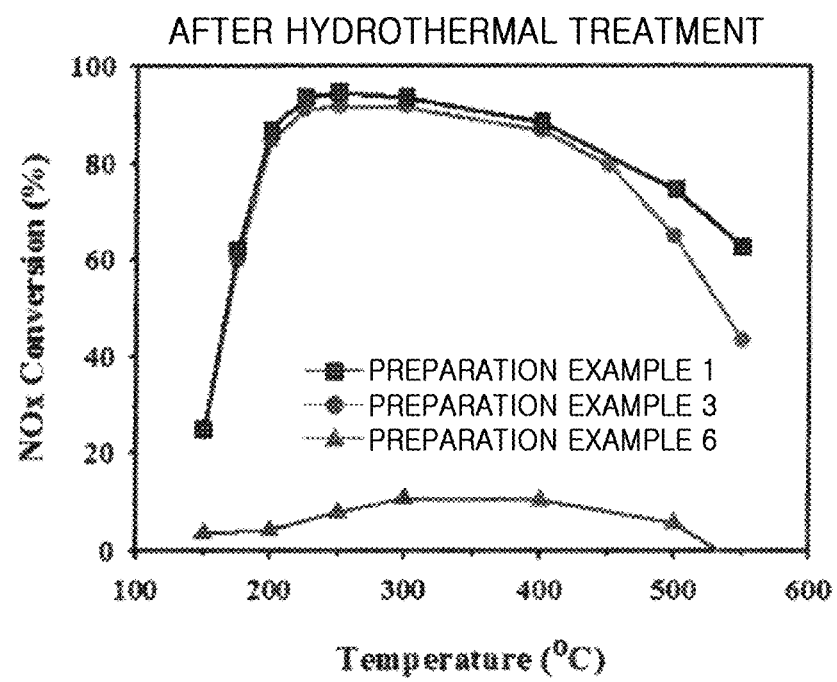

FIGS. 12 and 13 are graphs showing the catalytic performance ($NH_3$-SCR) of Preparation Examples 1, 3, and 6 of the present inventive concept.

Referring to FIGS. 12 and 13, it can be seen that before hydrothermal treatment, CHA having a higher aluminum content (Preparation Example 6) exhibited higher $NH_3$-SCR activity than other catalysts at high temperatures and lower $NH_3$-SCR activity than other catalysts at below 400° C. After hydrothermal treatment, the activity at high temperatures was lower as the aluminum content was higher, and particularly in the case of CHA having the highest aluminum content (Preparation Example 6), almost no activity was exhibited over the entire temperature range. Therefore, since the hydrothermal stability of CHA becomes very low when the aluminum content is high, it can be seen that by controlling the sodium hydroxide content in the synthesis mixture, the hydrothermal stability of the produced CHA can be greatly improved.

Figure 14:
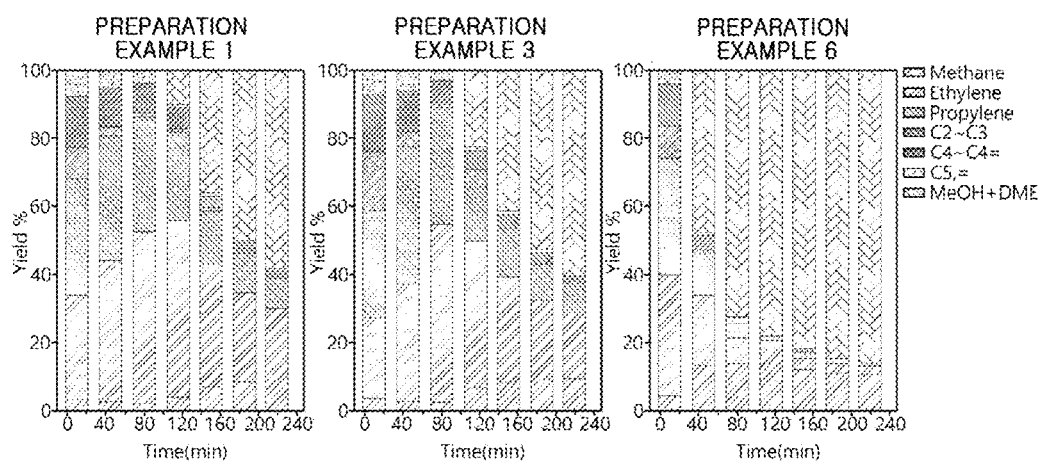
FIG. 14 shows graphs illustrating the catalytic performance (methanol-to-olefins (MTO) reaction) of Preparation Examples 1, 3, and 6 of the present inventive concept.

FIG. 14 shows graphs illustrating the catalytic performance (methanol-to-olefins (MTO) reaction) of Preparation Examples 1, 3, and 6 of the present inventive concept.

Referring to FIG. 14, it can be seen that in the case of Preparation Examples 1 and 3 where the aluminum content was appropriate, high selectivity to ethylene and propylene and a slow deactivation of the MTO reaction were observed, whereas in the case of Preparation Example 6 where the aluminum content was high, a rapid deactivation was observed due to coke formation in the zeolite pores.

Therefore, by properly adjusting the molar concentration of sodium hydroxide in the preparation of a zeolite synthesis mixture, it is possible to adjust the aluminum content of CHA synthesized and, accordingly, improve the activity and hydrothermal stability of zeolite used as a catalyst.

In addition, since the control of the aluminum content in CHA structure causes the properties of the prepared CHA to be significantly changed, the CHA can be applied to various fields.

The invention claimed is:
1. A method of producing a zeolite having a controlled aluminum content, the method comprising:
a first step of preparing a synthesis mixture comprising zeolite Y as a raw material of silica and alumina, trimethyladamantylammonium hydroxide (AdaOH) as a structure directing agent, and a sodium hydroxide; and a second step of preparing CHA by subjecting the synthesis mixture to a hydrothermal reaction and calcination;

wherein in the synthesis mixture, the sodium hydroxide is included at a molar concentration of 0.2 to 0.4 based on 1 of the silica, wherein the synthesis mixture does not contain CHA seed crystal.

2. The method of claim 1, wherein the CHA has a Si/Al molar ratio of 9.9 to 14.2 from an EDX.

3. The method of claim 1, wherein, in the synthesis mixture, the trimethyladamantylammonium hydroxide is included at a molar concentration of 0.15 based on 1 of the silica.

4. The method of claim 1, wherein the hydrothermal reaction is carried out at 120° C. to 140° C. for 2 days to 6 days under rotation of 0 rpm to 60 rpm, resulting in CHA production.

* * * * *